United States Patent [19]
Kogon

[11] 3,891,606
[45] June 24, 1975

[54] CURING WITH COMPLEXES OF SELECTED DIAMINES AND ALKALI METAL SALTS

[75] Inventor: Irving Charles Kogon, Wilmington, Del.

[73] Assignee: E. I. du Pont de Nemours & Company, Wilmington, Del.

[22] Filed: July 12, 1973

[21] Appl. No.: 378,551

[52] U.S. Cl. ........ 260/77.5 AM; 252/182; 260/2 N; 260/46.5 R; 260/33.4 UR; 260/47 EN; 260/75 NH; 260/79.1; 260/77.5 AC; 260/91.5; 260/91.7; 260/92.3; 260/92.8
[51] Int. Cl. ............................................ C08g 22/00
[58] Field of Search ........... 260/77.5 AM, 77.5 AC, 260/33.4 UR, 2 N, 46.5 R, 47 EN, 79.1, 91.5, 260/91.7, 92.3, 92.8, 75 NH

[56] References Cited
UNITED STATES PATENTS
3,755,261  8/1973  Van Gulick ............... 260/77.5 AM

OTHER PUBLICATIONS

Saunders et al., Polyurethanes, Part II, Interscience, N.Y., 1964, p. 303.

*Primary Examiner*—M. J. Welsh

[57] ABSTRACT

Amine-curable polymers are cured effectively by the use of a complex of 4,4'-methylene dianiline and/or racemic 2,3-di-(4-aminophenyl)butane and selected alkali metal salts including sodium chloride which complex is used in conjunction with a compound containing a source of active hydrogen, preferably polyfunctional compound such as a polyfunctional alcohol, e.g., glycerol. Optionally, the combination of the complex and the source of active hydrogens is dispersed in an inert organic liquid such as di(2-ethylhexyl)phthalate.

30 Claims, No Drawings

CURING WITH COMPLEXES OF SELECTED DIAMINES AND ALKALI METAL SALTS

BACKGROUND OF THE INVENTION

The curing of amine-curable polymers, such as isocyanato-terminated polyurethane prepolymers, epoxy resins and millable halogen-containing hydrocarbon polymers, is well known. In the past, curing has generally involved mixing the amine curing agent with the curable polymer by means suitable for the materials involved and forming the mixture into a useful form, followed by a heating step to complete the curing reaction. A problem which is encountered in this prior art procedure is the premature reaction of the curing agent with the curable polymer during the mixing step and during the interval following milling until the forming operation is completed. The problem posed by the premature reaction or curing varies widely in degree for different amine curing agent/polymer systems, but must be taken into consideration in most instances. In more reactive systems such as those employing isocyanato-terminated polyurethane prepolymers the problems resulting from prereaction have previously necessitated the use of special low residence time mixers and selected diamines of reduced reactivity as curing agents.

A method for preventing this premature reaction and bringing about an outstanding cure of the various amine-curable polymers such as isocyanato-terminated polyurethane prepolymers, epoxy resins and millable halogen-containing hydocarbon polymers is to be found in copending application U.S. Ser. No. 249,714, filed May 1, 1972, for Norman M. Van Gulick and now U.S. Pat. No. 3,755,261.

In essence, curing of polymers effected with amines is thought to involve chain extension of a prepolymer or cross linking of the polymer itself. In the case of the urethane and epoxy polymers a prepolymer is generally transformed from a viscous liquid having the molecular weight of less than about 3,000 to a solid having a molecular weight in excess of 10,000. The solids range from rubbery materials to hard plastics with a wide variety of known uses, e.g., molded tires, machine parts and potting compositions. In the case of amine-curable millable gums, such as polychloroprene, the gum is converted to a cross-linked elastomer with valuable physical properties.

The previously mentioned U.S. Ser. No. 249,714 represents a significant improvement in the art. The cure effected, however, by the technique included therein, requires the use of somewhat elevated temperatures. There are instances wherein it is desirable to operate at lower temperature, which can approach ambient conditions and further, there are instances when it is desirable to increase the rate of cure at elevated temperatures. Thus a need exists for a curing technique which will operate at lower temperatures or which will increase the rate of curing at elevated temperatures and still effect an outstanding cure of the polymer.

SUMMARY OF THE INVENTION

According to this invention a curing composition which will effect such cures has been discovered. The process of effecting the cure and the cured product are also intended to be within the scope of the instant invention. The curing composition comprises a compound which is a source of active hydrogen and a complex of 4,4'-methylene dianiline (MDA) and/or racemic 2,3-di-(4-aminophenyl) butane. The source of active hydrogen must have one or more Zerewitinoff active hydrogens and an ionization constant such that its $pK_a$ is greater than 6.0. The source of active hydrogen may be selected from alcohols, amines, thiols, phenols and polyfunctional alcohols to name a few representative examples. The most preferred source are the polyfunctional alcohols such as the glycols and in particular glycerol is especially preferred. The active hydrogen-containing compound as previously mentioned, is used in conjunction with the complex; the active hydrogen component makes up about 0.25 to 85 percent. The proportions of active hydrogen compound and complex can be adjusted so that substantially all of the curing is effected by the complex, in which case the active hydrogen compound accelerates the rate of cure. Alternatively, at least in the case of prepolymers which are reactive with the active hydrogen compound, the proportions may be selected so that both the complex and the active hydrogen compound effect the cure. The active hydrogen compounds contemplated for use bear one or more Zerewitinoff active hydrogens and have a $pK_a$ Greater than than 6.0.

With regard to the complex it is prepared by forming a complex between 4,4'-methylene dianiline and a salt, the salt being selected from nitrites and halides, except the fluorides, of sodium and lithium and sodium cyanide or by forming a complex between racemic 2,3-di(4-aminophenyl) butane and a halide salt, except the fluoride, of sodium, potassium, rubidium and cesium. Specifically, the compositions to be utilized as curing agents for amine-curable polymers include the reaction products of 4,4'-methylene dianiline with the following salts, in the ratio of 3 moles of methylene dianiline to 1 mole of salt: sodium chloride, sodium bromide, sodium iodide, sodium nitrite, lithium chloride, lithium bromide, lithium iodide, lithium nitrite and sodium cyanide, and the reaction products of racemic 2,3-di(4-aminophenyl) butane with the following salts in the ratio of 3 moles of diamine to 1 mole of salt: sodium chloride, sodium bromide, sodium iodide, potassium chloride, potassium bromide, potassium iodide, rubidium chloride, rubidium bromide, rubidium iodide, cesium chloride, cesium bromide and cesium iodide. The complex is then used in conjunction with a compound which is a source of active hydrogen.

Because of availability and cost, the complexes derived from 4,4'-methylene dianiline and sodium chloride or lithium chloride are especially preferred. In the discussion which follows reference will generally be made only to the complexes of 4,4'-methylene dianiline, but it is understood that they would apply equally as well to the complexes of racemic 2,3-di(4-aminophenyl) butane.

There are a variety of methods for preparing the complexes which are used in the instant invention in conjunction with the source of active hydrogen.

In one method for preparing the complexes of this invention, an aqueous solution or brine containing a sodium or lithium salt selected from the class consisting of the chloride, bromide, iodide and nitrite is reacted with 4,4'-methylene dianiline (MDA), either in a solvent, having a degree of mutual solubility for both water and for the MDA, such as an alcohol, or with solid MDA in the substantial absence of a solvent. If the salt is present in relatively dilute concentration, for example between about 1 percent and about 12 percent by weight, a solvent for the MDA preferably is employed. If the salt is present in concentration above about 12 percent by weight, then no solvent need be employed, solid crystalline MDA being added directly to the salt solution.

A crystalline precipitate formed by interaction of the salt and the MDA is separated from the liquid phase, e.g., by filtration. The precipitate has a 3:1 mole ratio of MDA to salt and may be decomposed into its original constituents by adding a solvent such as acetone at an elevated temperature in the range of about 40° to 100°C., depending on the volatility of the solvent.

In the solvent method of preparing the complexes, a relatively dilute aqueous solution (1 to 12 percent by weight salt) of a sodium or lithium salt selected from the group comprising the chloride, bromide, iodide, and nitrite may be mixed with a solution of 4,4'-methylene dianiline in a suitable solvent, e.g., methanol, at a temperature in the range from about 20° to 60°C. Under these conditions, the MDA reacts with the sodium or lithium salt to form a crystalline precipitate consisting of MDA and the salt in a 3:1 mole ratio. The crystalline precipitate is then separated from the mother liquid by filtration, decantation, centrifuging or other suitable operation.

In the method of preparation in which a more concentrated salt solution (more than about 12 percent by weight of salt) may be employed, solid crystalline MDA is added to the salt solution with agitation at a somewhat higher temperature in the range of from about 50° to 90°C. in an amount somewhat in excess of the stoichiometric quantity required to react with that amount of salt which is present in excess of about 12 percent by weight. Under these conditions three moles of MDA react with one mole of salt to form a crystalline precipitate which may be separated from the remaining solution by filtration, decantation, centrifuging or other suitable operation.

Complexes of other salts, such as sodium nitrite may be formed by substantially the same procedures outlined for the sodium chloride complexes.

The complex and the active hydrogen compound may be added to the amine-curable polymer in sequence or in combination. The most convenient manner of adding the complex and active hydrogen compound will vary depending on the nature of the specific active hydrogen compound being employed, the polymer being cured and the equipment available.

In a preferred form of the instant invention the complex, with or without the active hydrogen compound, is dispersed in an inert liquid carrier such as di(2-ethylhexyl) phthalate. By an inert liquid carrier or vehicle it is meant one which will not promote rapid decomposition of the complex and will also be unreactive toward the polymer or prepolymer which is being cured. The vehicle must also be free flowing or mobile to facilitate commingling of the complex and optionally the active hydrogen compound and the polymer or prepolymer.

The liquid carrier need not necessarily be inert and may if desired be the active hydrogen compound.

The combination of the source of active hydrogen and complex may then be utilized for the curing of amine curable prepolymers or polymers; typical of polymers; typical of these polymers are the various urethane polymers and prepolymers. Other prepolymers or polymers which may be cured with the complex of the instant invention include the following:

1. Epoxy resins such as those disclosed in the Encyclopedia of Polymer Science and Technology Interscience Publishers, New York (1967), Volume 6, pp. 212–221. The curing of certain epoxy resins with methylene dianiline is described in U.S. Pat. No. 2,773,048 to Formo et al. In the present process, the amine complex can be used in equivalent amounts to those suggested for the free diamine by U.S. Pat. No. 2,773,048 and the Encylopedia of Polymer Science and Technology, Volume 6, pp. 226–230.

2. Halogen-containing hydrocarbon polymers such as chloroprene polymers, chlorinated butyl rubber and chlorinated polyethylene and polypropylene. Chloroprene polymers are described in the Encyclopedia of Polymer Science and Technology, Volume 3, (1965), pp. 705–728. Chlorinated butyl rubber and its curing by diamines is described in British Pat. No. 815,939. In curing halogen-containing polymers of these types with the complex used in the instant process, it is customary to include a metal oxide acid acceptor such as zinc oxide.

The curing or cross-linking of hydrofluorinated polymers with polyamines is disclosed in U.S. Pat. No. 2,979,490 to West.

3. Chlorosulfonated polymers such as those described in U.S. Pat. No. 2,723,257 to McAlevy, which patent relates to the curing of such polymers with aromatic diamines including methylene dianiline.

4. Polymers containing acid halide groups such as

and haloformate groups, such as

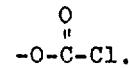

The curing of these polymers with methylene dianiline is analogous to the curing of chlorosulfonated polymers.

5. Polymers containing anhydride groups which on reaction with diamines yield amide-acid linkages.

6. Organopolysiloxanes such as described in U.S. Pat. No. 2,938,010 to Bluestein, which patent relates to the use of diamines as curing agents for organopolysiloxanes.

All patents and articles referred to above are herein incorporated by reference.

The prepolymers and/or polymers are admixed with the complexes described above and an active hydrogen compound and then cured by standard techniques.

The curing may be effected at temperatures between about 0° to 220°C. depending on the polymer being cured.

The source of active hydrogen may serve as a curing agent itself in the case of polymers which are reactive with active hydrogen compounds in general or merely to accelerate the cure. It has been found unexpectedly that when the active hydrogen participates in the cure a synergistic effect is observed; that is, a cure which is faster is observed than one which would be found when using either the complex or the active hydrogen-containing compound alone.

DETAILED DESCRIPTION

Since the urethanes (that is, prepolymers and polymers containing isocyanato groups) are typical polymers which may be cured by the process of the instant invention a more detailed description of the curing procedure with the urethanes will be included; it should be emphasized that there is no intention to limit the invention, however, to the urethanes but rather all amine-curable polymers and prepolymers of which the above-mentioned are representative are intended to be within the scope of the instant invention.

The polyurethanes are generally formed by first reacting a polyether polyol or a polyester polyol with a molar excess of an organic diisocyanate to form a prepolymer having terminal isocyanato groups. The prepolymer is then cured to increase its molecular weight from less than about 3,000 to upwards of about 10,000. Examples of such polymers are described in U.S. Pat. Nos. 2,620,516; 2,777,831; 2,843,568; 2,866,774; 2,900,368; 2,929,800; 2,948,691; 2,948,707; 3,114,735; herein incorporated by reference.

The source of active hydrogen may be defined as a compound bearing one or more Zerewitinoff active hydrogens and having an ionization constant such that its $pK_a$ is greater than 6.0.

Generally, the active hydrogen compound or source will make up about 0.25 to 85 weight percent, preferably 0.5 to 70 weight percent, based on the weights of complex and active hydrogen-containing compound taken together.

The combination of complex and active hydrogen compound, referred to herein as the curing agent, should provide a minimum of 70 percent of the theoretical amount of active hydrogen required to react with the NCO groups contained in the polyurethane prepolymer. In making this calculation it is assumed that the methylene dianiline provided by the complex reacts with the polymer in the same way that free methylene dianiline reacts. The amount of complex employed generally should not exceed about 120 percent that required in theory to react with the NCO groups of the prepolymer. Calculation of this upper limit is based solely on the amount of complex and does not include the active hydrogens provided by the active hydrogen compound.

The resulting combination of active hydrogencontaining compound and complex, whether utilized as a dispersion in an inert or active organic liquid or as a solid will generally effect a much more rapid cure of the urethane prepolymer or polymer at a given temperature and/or may be used to effect curing at a lower temperature. Typically, temperatures between about 0° to 195°C. may be utilized and preferably between about 20° and 150°C. The time for curing will vary generally between about 1 minute and 24 hours and preferably between about 5 minutes and 6 hours. Cures at ambient conditions may take place within about 5 minutes and 6 hours.

By curing isocyanate-terminated prepolymers at about ambient temperatures (15°–35°C.) with a limited amount of active hydrogen compound present, it is possible to prepare partially cured products known in the art as plastic gums. These materials are useful in that they may be stored for extended periods of time before being used for compression molding. This formation of plastic gum followed eventually by compression molding is known as B-stage processing in the plastics industry. The exact amount of active hydrogen compound required to prepare plastic gum depends on the active hydrogen compound and the prepolymer being used. For this particular application, alcohols or polyols are generally preferred. 1,4-Butanediol has been found to be very useful in preparing plastic gums, the amount required being on the order of 5 parts per 100 parts of prepolymer for typical commercial prepolymers.

The active hydrogen-containing compound can be selected from a broad group of compounds which are characterized by the presence of at least one Zerewitinoff active hydrogen and which further have an ionization constant such that their $pK_a$ is greater than 6.0. The most useful classes of active hydrogen-containing compounds are alcohols, polyols, phenols and primary and secondary aromatic amines. The $pK_a$ limitation excludes compounds containing acidic groups such as carboxylic, sulfonic and sulfinic acids as these have been found to be ineffective in the present process. It is believed that these strong acids interfere with curing by forming salts with the methylene dianiline provided by the complex. In general, active hydrogen compounds which are liquids or low melting solids are preferred because of the difficulty of dissolving high melting solids in the system to be cured. The latter are not meant to be excluded because they are effective in the present process.

Specifically, alcohols which may be utilized include compounds containing at least one primary, secondary or tertiary hydroxyl group attached to an aliphatic carbon atom. The aliphatic carbon atom may be in a ring. Alcohols which can be used in the present process range from compounds having equivalent weights of about 30 such as methanol, ethylene glycol and glycerol up to polyalkylene ether and polyester polyols having equivalent weights up to about 2000. Illustrative compounds include methanol, n-propanol, isopropanol, n-butanol, cyclohexanol, dodecanol-1, benzyl alcohol, ethylene glycol, 1,3-butanediol, 1,4-butanediol, 1,6-hexanediol, glycerol, 1,2,6-hexanetriol, trimethylol propane, pentaerythritol and sorbitol. Alcohols containing inert linkages such as ether, thioether and ester linkages are also meant to be included. Illustrative low molecular weight compounds of these types include diethylene glycol, dipropylene glycol, 2-ethoxyethanol, bis($\beta$-hydroxyethyl)sulfide, ethyl lactate, phenyl 2-hydroxyisobutyrate 4-hydroxybutyl benzoate and bis(-$\beta$-hydroxyethyl)o-phthalate. Alcohols or polyols derived from any of the above types of compounds by oxyalkylation with cyclic oxides such as ethylene oxide, propylene oxide and butylene oxide are also meant to be included. These condensation products can range from relatively low molecular weights up to materials having equivalent weights as high as 2000. Another class of materials ranging from relatively low molecular weights up to equivalent weights of about 2000 are the hydroxyl-terminated polyesters derived from any di- or polyhydroxyl compound of the types listed above by reaction with polycarboxylic acids such as adipic acid, succinic acid, glutaric acid, fumaric acid, phthalic acid or trimellitic acid.

Preferred hydroxyl compounds have 2 or 3 hydroxyl groups and a hydroxyl equivalent weight of less than 60. In general, these materials exhibit the greatest effect for a given amount on the present process. Especially preferred are glycerol and 1,4-butanediol.

A second preferred class of hydroxyl compounds are the polyalkylene ether glycols and polyester glycols having equivalent weights of about 200–2000. These materials can be used as carrier liquids for dispersions of the methylene dianiline-salt complex. These dispersions will be discussed in greater detail hereinafter.

Phenols which may be utilized include representative compounds such as phenol, cresol, α-(β-)-maphthol, catechol, hydroquinone, resorcinol, 4-phenylphenol, 4-dodecylphenol, 4,4'-dihydroxybiphenyl, 4,4'-methylenebis (phenol), bisphenol A, p-chlorophenol, 4-methoxyphenol, 4-phenoxyphenol and phenyl salicylate. As indicated by the above compounds phenols containing inert substituents such as alkyl, aryl, alkoxy, aryloxy, halogen and ester groups may be used in the instant process.

Thiol derivatives corresponding to the alcohols and phenols just described, in which the —OH group is replaced by an —SH group, are also included in the present invention.

Amines which can be utilized include primary and secondary mono- and polyamines in which the amine nitrogen can be substituted with alkyl or aryl groups. Representative compounds include ethyl amine, diethyl amine, butyl amine, ethylene diamine, diethylene triamine, aniline, toluidine naphthylamine phenylene diamine, tolylene diamine, p-chloroaniline, 2,5-dichloro-1,4-phenylene diamine, cyclohexyl amine, dicyclohexyl amine, N-methylaniline, diphenylamine, N-phenyl-β-naphthylamine, methylene dianiline, 3,3'-dichlorobenzidine, 4,4'-methylenebis(2-chloroaniline), methyl anthranilate and anisidine. In general, amines in which the amine nitrogen is substituted with one or two aryl groups are preferred because their reactivity with isocyanato groups is such to permit ready processing. The amines with only alkyl substituents must be used in limited amounts because of their high reactivity.

Aminoalcohols and aminophenols of which ethanolamine and m-aminophenol are representative may also be used.

While alcohols, phenols and amines are the preferred classes of active hydrogen-containing compounds for use in the present curing process there are numerous other classes of materials which contain Zerewitinoff active hydrogen and have a $pK_a$ greater than than 6.0. The compounds include water, hydrogen sulfide, amides such as formamide, N-methyl formamide epsiloncaprolactam, and N-ethyl benzamide; ureas such as urea itself, N,N-dibutyl urea and N,N,N'-triethyl urea; heterocyclic compounds containing urea linkages such as imidazalones, hydantoin, barbituric acid and cyanuric acid and derivatives thereof; oximes such as methyl ethyl ketone oxime and cyclohexanone oxime, hydroxylamines such as hydroxylamine itself and N-ethylhydroxylamine, 1,3-dicarbonyl compounds capable of enolization such as acetoacetic esters and acetylacetone. Additional classes of compounds of lesser importance are enumerated in Zerewitinoff's work reported in Ber. 47 2417 (1914) and preceding papers which is herein incorporated by reference.

As previously indicated the complex, and optionally the active hydrogen compound, may be dispersed in an inert organic vehicle liquid in a preferred embodiment of the instant invention.

Typical examples of such vehicle liquids include di(2-ethylhexyl) phthalate and Dutrex 739 oil, an aromatic process oil which is a product of the Shell Oil Company and comprises 0 percent asphaltenes, 18 percent polar compounds, 76 percent aromatics and 6 percent saturated petroleum derivatives determined by the Clay-Gel method of ASTM D2007. Additional useful liquids include other esters of phthalic acid and related isophthalate and trimellitate esters, aromatic and naphthenic hydrocarbon processing oils or extenders, halogenated biphenyls and liquid aromatic sulfonamides. Paraffinic hydrocarbon oils can also be used but in general they have limited compatibility with most of the well-known amine-curable polymers and therefore are of value only on rare occasion.

In addition an oil-soluble dispersing agent may be added if desired. The dispersing agent serves to facilitate dispersion of the complex in the vehicle liquid and reduces the viscosity of the resulting dispersion. A typical dispersing agent which has proven effective is lecithin. Other oil-soluble surface active agents can be used. The following is indicative of the value of lecithin in the dispersions. The viscosity of a dispersion containing a mixture of equal weights of the complex and di(2-ethylhexyl) phthalate without lecithin has a Brookfield viscosity of about 16,000 cps, whereas the addition of 1 percent (based on the weight of complex) of lecithin reduces the viscosity to around 2,000 cps. Other materials may be included in the dispersion such as carbon black, pigments, antioxidants, flame retardants, etc.

Dispersions containing up to about 75 weight percent of complex can be prepared. Generally it is more convenient to prepare and use dispersions containing 40 to 60 weight percent of complex. Obviously, the dispersions can be prepared at or diluted to lower concentrations of the complex if desired. A surface active agent, if added, would constitute up to 5 weight percent based on the weight of complex and preferably 0.5 to 2.0 weight percent. It should be emphasized that the surface active agent is optional.

On occasion it may be desirable to dissolve or disperse the active hydrogen-containing compound in the dispersions of the complex. When the active hydrogen compound is soluble in the dispersion, simple mechanical mixing is adequate to incorporate the compound throughout the dispersion. Obviously, if the active hydrogen compound is an immiscible liquid or solid more vigorous agitation will usually be required to obtain a uniform curing composition.

In addition to dispersions of the complex in inert solvents, it has been found that dispersions can be prepared in relatively high molecular weight glycols and polyols (equivalent weights of 200–2000). These may be prepared by substantially the same procedures used for dispersions in inert carrier liquids. In employing these dispersions, it is usually preferred to use an amount such that the combined available active hydrogen provided by the glycol (or polyol) and the complex is not greater than about equivalent to the isocyanato groups in the prepolymer. By operating in this way, all of the reactive carrier liquid is incorporated into the cured polymer and possible migration or loss of the carrier liquid from the polymer is avoided with certainty. It is obvious that combinations of inert and reactive carrier liquids may be employed to advantage on occasion. The reactive carrier liquids have been described hereinbefore and include polyalkylene ether glycols and polyols and polyester glycols and polyols all of which are well known polyurethane intermediates.

If used in the solid form prior to the curing operation itself, mixing and/or milling of the polyurethane with finely divided particles of a complex and the active hydrogen-containing source is required. Typically, the complex particle size will be between about 0.5 and 50 microns, preferably 1 to 20 microns. Grinding of the complex can be accomplished in standard grinding equipment such as the fluid energy mill and vertical hammer mills employing air classification to remove ground materials from the mill.

If a dispersion in an inert liquid is to be utilized, that is to say a liquid such as di(2-ethylhexyl) phthalate, prior to the curing operation itself, the dispersion and the amine-curable polymer or prepolymer must be commingled.

A preferred curing agent is the combination of 4,4'-methylene dianiline and sodium chloride in complex, and glycerol as the source of active hydrogen. The glycerol will represent between about 0.25 and 20 percent weight, preferably 0.5–12 percent, of the total curing agent which is the complex and the active hydrogen-containing compound. The dispersion when used with a liquid prepolymer such as isocyanato-terminated urethane prepolymers or liquid epoxy resins, is mixed with the curable polymer or prepolymer by means ranging from hand mixing with a spatula up to continuous high speed mixers of the type normally used for mixing diamines with polyurethane prepolymers. Commingling can also be effected in static mixing devices, e.g., Kenics Mixers (Kenics Corp.) alone or in combination with mechanical mixers. In order to insure vulcanizates free of bubbles the mixture of dispersion and prepolymer should be degassed by agitating under vacuum before use. Alternatively, the dispersion and prepolymer may be degassed separately prior to mixing under conditions which do not permit contact with gases such as air. In the case of a solid type polymer or gum which is to be cured, the dispersion may be commingled on a rubber mill or in an internal mixer (a Banbury Mixer). Once the gum has been banded on the mill or broken down in the internal mixer, the dispersion can be added directly and milling or mixing continued until a uniform mixture has been prepared.

In mixing the dispersion of complex with either fluid prepolymers or millable gums the temperature must be kept below the decomposition point of the complex in order to avoid the possibility of premature curing. In the present process the decomposition point of the complex is a function of the particular complex being used and the polymer in which the complex is dispersed. For isocyanatoterminated urethane prepolymers and the sodium chloride complex of methylene dianiline, mixing should be performed below 80°C. and preferably below about 50° to 60°C. in the absence of the active hydrogen compound. Once the active hydrogen compound and the complex are both present curing will start in most urethane systems at temperatures as low as 0°C.

The temperature which can be utilized during the curing of the urethane prepolymer will be from about 0° to 195°C.; times for complete cure will range between about 1 minute and 24 hours.

Curing times vary with other polymer systems as previously indicated. In general, cure times recommended for prior art curing processes using free diamines are satisfactory for the present process because recommended cure temperatures are generally in excess of the decomposition point of the complex. For epoxy resins, cure times of 15 seconds to 15 minutes at temperatures of 120° to 190°C. are suggested. For halogen-containing hydrocarbon polymers times of about 1 minute to 2 hours at temperatures of about 100° to 220°C. are suggested. Similar conditions can be used for chlorosulfonated polyethylene.

It is believed that the reactions which take place in the present curing process are identical to those which occur when free MDA is used as a curing agent by prior art curing procedures.

The curing equipment and curing procedures used in the present process are conventional.

The resulting cured products may be used effectively in any molded urethane product such as automotive trims, etc.

The following examples are illustrative of the present invention and therefore are not intended in any way as a limitation of the scope thereof. Parts and percents are by weight unless otherwise indicated.

EXAMPLES

The properties of the vulcanizates reported in the following examples are determined by the following ASTM test methods.

| | |
|---|---|
| Modulus at 300% elongation, $M_{300}$ | ASTM D412 |
| Elongation at Break, $E_B$ | ASTM D412 |
| Tensile at Break, $T_B$ | ASTM D412 |
| Shore A Hardness | ASTM D676 |
| Shore D Hardness | ASTM D1484 |
| Compression Set, Method B | ASTM D395 |
| Tear Strength | ASTM D470 |

Stress-strain measurements by ASTM D412 are made with a crosshead speed of 10 in./min.

Polymer A

Toluene -2,4-diisocyanate (348.4 parts; 2.0 mole) and polytetramethyleneether glycol (No. avg. mol. wt. 1000; 1000 parts) was agitated at 80°C. for 4 hours in a dry reaction vessel protected from atmospheric moisture. Polymer A thus obtained has a free NCO group content of 6.4 wt. percent, a Brookfield viscosity 30°C. of 6000–7000 cps and a no. avg. mol. wt. of about 1310.

POLYMER B

Toluene -2,4-diisocyanate (348.4 parts; 2.0 mole), polytetramethyleneether glycol (no. avg. mol. wt. 1000; 500 parts; 0.5 mole) and 1,3-butanediol (45 parts; 0.5 mole) are agitated at 80°C. for 4 hours in a dry reaction vessel protected from atmospheric moisture. Polymer B has a free NCO group content of 9.5 wt. percent, a Brookfield viscosity at 30°C. of 12–15,000 cps and a no. avg. mol. wt. of about 870.

CURATIVE A

A mixture of equal weights of the complex of 3 moles of methylene dianiline and 1 mole of sodium chloride (3 MDA NaCl) and di(2-ethylhexyl) phthalate and 1.0 percent lecithin based on the weight of complex is ball milled for 36–48 hours to produce a dispersion of complex in which >90 percent of the particles of complex have a diameter of <20 microns as determined from photomicrographs.

EXAMPLE 1

To Polymer A (50 parts) at 25°C. is added 1,4-butanediol (3.45 parts) and Curative A (14 parts). The amount of Curative A used provides 0.85 amine groups per NCO group. After the mixture thereby obtained has been stirred for 2 minutes it is allowed to stand and become a soft wax (17 min.). After six hours it is placed in a hot compression mold and cured therein for 30 min. at 140.5°C. The vulcanizate obtained displays the following properties:

| | |
|---|---|
| $M_{300}$, psi | 1171 |
| $E_B$, % | 560 |
| $T_B$, psi | 3182 |
| Shore A Hardness | 85 |
| Compression Set, %, Method B, 22 hr. at 70°C. | 38 |
| Tear Strength, pli | 105 |

After standing for 24 hours at 25°C., the soft wax can still be compression molded under the same conditions.

EXAMPLE 2

To Polymer A (50 parts) at 25°C. is added a mixture consisting of 1,4-butanediol (3.45 parts) and micronized [tris(methylene dianiline)sodium chloride] (7 parts).

The amount of complex used provides 0.85 amine groups per NCO group. After the mixture thereby obtained has been stirred for 2 minutes it was allowed to stand and become a soft wax (30 min.). The material is placed in a hot compression mold and cured therein for 30 min. at 140.5°C. The vulcanizate obtained displays the following properties:

| | |
|---|---|
| $M_{300}$, psi | 1471 |
| $E_B$, % | 501 |
| $T_B$, psi | 4174 |
| Shore A Hardness | 87 |
| Tear Strength, pli | 97.5 |

EXAMPLE 3

To Polymer A (400 parts) at 60°C. is added molten (110°C.) 4,4'-methylenebis(2-chloroaniline) (40 parts). The two materials are mixed for 2 minutes and then Curative A (56 parts) at room temperature is added and mixing is continued for an additional 2 minutes. The mixture thereby obtained is poured in a mold and heated for 10 min. at 80°C. then compression molded at 140.5°C. for 15 minutes. The total amine groups per NCO group is 0.92. The vulcanizate obtained displays the following properties:

| | |
|---|---|
| $M_{300}$, psi | 2348 |
| $E_B$, % | 396 |
| $T_B$, psi | 3996 |
| Shore A Hardness | 89 |
| Tear Strength, pli | 121.5 |

EXAMPLE 4

To Polymer B (100 parts) at room temperature is added 1,4-butanediol (5.04 parts) and the materials are mixed for 2 minutes; then Curative A (24.8 parts) is added and mixed for 2 minutes. After 8 minutes a hard wax is obtained (Shore A Hardness 35) which contains 35.0 mg. NCO/100 gm. polymer. After 2 hours, the wax is put into a hot mold and compression molded at 140.5°C. for 30 minutes. The total amine groups per NCO is 0.5. The vulcanizate obtained displays the following properties:

| | |
|---|---|
| $M_{300}$, psi | 2500 |
| $E_B$, % | 373 |
| $T_B$, psi | 3200 |
| Shore D Hardness | 60 |
| Tear Strength, pli | 157.6 |

EXAMPLE 5

To Polymer B (100 parts) at room temperature is added 1,4-butanediol (1.0 part), mixed for 2 minutes and then Curative A (44.6 parts) is added. After the mixture thereby obtained has been stirred 2 minutes and heated at 80°C. for 7 minutes, a wax is obtained (Shore A Hardness ~25) which contains 35.6 mg. NCO/100 gm. polymer. The wax is placed in a hot mold and compression molded at 140.5°C. for 30 minutes. The total amine groups per NCO is 0.91. The vulcanizate obtained displays the following properties:

| | |
|---|---|
| $M_{300}$, psi | 3468 |
| $E_B$, % | 280 |
| $T_B$, psi | 3400 |
| Shore D Hardness | 65 |
| Tear Strength, pli | 152.3 |

EXAMPLE 6

To Polymer A (100 parts) at 80°C. is added 1,4-butanediol (0.68 part) and the materials are mixed for 1 minute. Then Curative A (31 parts) is added and stirring is continued for 2 minutes. Curative A provides 0.935 amine groups per NCO group. The resulting mixture is held at 80°C. for 16 minutes after which a waxy solid polymer is obtained. The wax is placed in a hot mold and compression molded at 129.5°C. for 30 minutes. The vulcanizate has the following properties:

| | |
|---|---|
| $M_{300}$, psi | 1666 |
| $E_B$, % | 580 |
| $T_B$, psi | 3873 |
| Shore A Hardness | 93 |
| Tear Strength, pli | 154.6 |

Substantially the same results are obtained when the butanediol is replaced with 0.46 parts of glycerine or with 1.0 parts of dipropylene glycol with the exceptions that the waxy polymer forms in 5 minutes in the glycerine run and 7 minutes in the dipropylene glycol run.

EXAMPLE 7

To Polymer A (100 parts) at 80°C. is added a mixture consisting of glycerine (.46 part) and Curative A (31 parts). After the mixture thereby obtained has been stirred for 2 minutes and placed in an oven at 80°C. for 2 minutes a wax is obtained. The wax is then placed in a hot mold and compression molded at 129.5°C. for 30 minutes. The total amine groups per NCO group is 0.935. The vulcanizate obtained has the following properties:

| | |
|---|---|
| $M_{300}$, psi | 1950 |
| $E_B$, % | 380 |

-Continued

| | |
|---|---|
| $T_B$, psi | 3000 |
| Shore A Hardness | 93 |
| Tear Strength, pli | 141.1 |

EXAMPLE 8

To Polymer A (100 parts) at 50°C. is added 1,4-butanediol (1.71 parts), mixed for 2 minutes and then Curative A (23 parts) is added. This amount of Curative A provides 0.69 amine groups per NCO group. After the mixture thereby obtained is stirred for 2 minutes it is allowed to stand at room temperature. After 50 minutes a soft wax is obtained. The wax is placed in a hot mold and compression molded at 149°C. for 10 minutes. The vulcanizate obtained has the following properties:

| | |
|---|---|
| $M_{300}$, psi | 2000 |
| $E_B$, % | 490 |
| $T_B$, psi | 4820 |
| Shore A Hardness | 92 |
| Shore D Hardness | 47 |
| Tear Strength, pli | 104 |

EXAMPLE 9

To Polymer A (100 parts) at 100°C. is added 1,4-butanediol (0.34 part). After mixing for 1 minute Curative A (31 parts) is added. The mixture thus obtained is stirred for 25 minutes to yield a soft wax. The wax is placed in a hot mold and compression molded at 149°C. for 10 minutes. The total amine groups per NCO group is 1.0. The vulcanizate obtained displayed the following properties:

| | |
|---|---|
| $M_{300}$, psi | 1923 |
| $E_B$, % | 540 |
| $T_B$, psi | 5000 |
| Shore A Hardness | 93 |
| Shore D Hardness | 50 |
| Tear Strength, pli | 135 |

When the procedure of this example is repeated with the exception that 0.68 part of 1,4-butanediol is used, substantially the same results are obtained except that formation of the waxy polymer requires only 7 minutes.

EXAMPLE 10

To Polymer B (100 parts) at room temperature is added glycerine (1.2 parts). After mixing for 1 minute, 44 parts of Curative A is added and mixing continued for 1 minute. On standing, mixture forms a soft wax in 18 minutes. The wax is placed in a hot mold and compression molded under different conditions. The total amine groups per NCO group used is 1.0. The vulcanizate data and molding conditions are tabulated below:

| Molding Condition °C./Min. | Shore D Hardness | $M_{300}$ psi | $T_B$ psi | $E_B$ % | Tear Strength pli |
|---|---|---|---|---|---|
| 129.5/30 | 65 | 2600 | 4300 | 280 | 130 |
| 140.5/20 | 65 | 2450 | 4900 | 340 | 154 |
| 149 /10 | 65 | 2400 | 5000 | 340 | 132 |

EXAMPLE 11

To 50 parts of Polymer A at room temperature, is added 1 part of glycerine and the mixture is then mixed for 1 minute; Curative A in the amount of 15.5 parts is then added and the mixture is mixed for 3 minutes and poured into an aluminum pan. After 5 minutes a tough cured elastomer is obtained containing 3.1 mg. NCO/100 gm. of polymer and having a Shore A hardness of 83. The run is then repeated using Polymer B, 1 part glycerine and 22 parts of Curative A. After 1 minute of mixing the mass is poured into an aluminum pan; after 4 minutes a hard tough elastomer is obtained having a Shore D hardness of 55.

When 1 part of glycerine is mixed with 50 parts of Polymer A or Polymer B at room temperature in the absence of Curative A, the resulting mixtures remain fluid indefinitely. When Curative A in the amounts specified above is added to Polymers A and B in the absence of glycerine, the resulting mixtures remain fluid at room temperature for at least 48 hours.

EXAMPLE 12

A dispersion of [tris(methylene dianiline) sodium chloride] complex is prepared by ball milling the following formulation for 24 hours.

| | |
|---|---|
| Polytetramethylene ether glycol, number average molecular weight 980 | 670 parts |
| di(2-ethylhexyl) phthalate | 70 parts |
| Lecithin | 15 parts |
| [Tris(methylene dianiline) sodium chloride], average particle size ~5 microns | 745 parts |

To Polymer B (100 parts) is added to the above dispersion (44 parts) and the materials are mixed for 1 minute. The mixture is then poured in a 100°C. open mold. After 1 hour at 100°C. a cured tough rubbery elastomer having a Shore D hardness of 62 is obtained.

I claim:

1. A process for curing an amine-curable polymer or prepolymer which comprises curing said polymer with a curing agent consisting essentially of (a) a source of active hydrogen having one or more Zerewitinoff active hydrogens and an ionization constant such that its $pK_a$ is greater than 6.0, and (b) a complex of 4,4'-methylene dianiline and a salt, the salt being selected from the group consisting of sodium chloride, sodium bromide, sodium iodide, sodium nitrite, lithium chloride, lithium bromide, lithium iodide, lithium nitrite and sodium cyanide, or a complex of racemic 2,3-di(4-aminophenyl)butane with a salt, said salt being selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide; the ratio of said dianiline or said butane to said salt in said complex being 3 moles to 1 mole.

2. A process for curing an amine-curable polymer or prepolymer which consists essentially of curing said polymer or prepolymer with (a) an active hydrogen source having one or more Zerewitinoff active hydrogens and an ionization constant such that its $pK_a$ is greater than 6.0, and (b) a complex of 4,4'-methylene dianiline and a salt, selected from the group consisting of sodium chloride, sodium bromide, sodium iodide, sodium nitrite, lithium chloride, lithium bromide, lithium iodide, lithium nitrite and sodium cyanide, the ratio of said dianiline to said salt in said complex being 3 moles to 1 mole.

3. The process of claim 2 wherein said prepolymer or polymer is a urethane containing free isocyanato groups.

4. The process of claim 3 wherein said curing takes place at ambient temperature and a plastic gum is formed.

5. The process of claim 3 wherein said complex is derived from 4,4'-methylene dianiline and sodium chloride.

6. The process of claim 3 wherein said complex is derived from 4,4'-methylene dianiline and lithium chloride.

7. The process of claim 3 wherein said curing takes place at a temperature of about 0° to 195°C.

8. The process of claim 3 wherein said source of active hydrogen is selected from the group consisting of alcohols, polyols, phenols and primary and secondary aromatic amines.

9. The process of claim 3 wherein said source of active hydrogen is a polyfunctional alcohol.

10. The process of claim 3 wherein said source of active hydrgen is 1,4-butanediol.

11. The process of claim 3 wherein said source of active hydrogen is glycerol.

12. The process of claim 1 wherein the complex and source of hydrogen are maintained in a dispersion of an inert liquid which is subsequently commingled with the amine-curable polymer or prepolymer.

13. The process of claim 12 wherein said inert liquid is di(2-ethylhexyl)phthalate.

14. The product of claim 1.
15. The product of claim 2.
16. The product of claim 3.
17. The product of claim 9.
18. The product of claim 10.
19. The product of claim 11.
20. The product of claim 4.

21. A composition of matter consisting essentially of a partially cured, compression-moldable plastic gum prepared by mixing an amine-curable prepolymer or polymer with a curing agent and partially curing said polymer or prepolymer; said curing agent consisting essentially of (a) a source of active hydrogen having one or more Zerewitinoff active hydrogens and an ionization constant such that its $pK_a$ is greater than 6.0, and (b) a complex of 4,4'-methylene dianiline and a salt, the salt being selected from the group consisting of sodium chloride, sodium bromide, sodium iodide, sodium nitrite, lithium chloride, lithium bromide, lithium iodide, lithium nitrite and sodium cyanide, or a complex of racemic 2,3-di (4-aminophenyl) butane with a salt, said salt being selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide, the ratio of said dianiline or said butane to said salt in said complex being 3 moles to 1 mole.

22. The composition of claim 21 wherein the polymer being cured is an isocyanate-terminated polyurethane, the source of active hydrogen is 1,4-butanediol, and the complex is a complex of 4,4'-methylene dianiline and sodium chloride.

23. As a new composition of matter, a dispersion of (1) a complex of 4,4'-methylene dianiline and a salt, the salt being selected from the group consisting of sodium chloride, sodium bromide, sodium iodide, sodium nitrite, lithium chloride, lithium bromide, lithium iodide, lithium nitrite and sodium cyanide, or a complex of racemic 2,3-di(4-amino-phenyl)butane with a salt, said salt being selected from the group consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide, the ratio of said dianiline or said butane to said salt in said complex being 3 moles to 1 moles, in (2) a liquid selected from the group consisting of a poly(alkylene ether)glycol, a poly-(alkylene ether) polyol, and a hydroxyl-terminated polyester of a polyhydroxyl alcohol and a polycarboxylic acid.

24. The dispersion of claim 23 which additionally contains an inert liquid carrier.

25. The dispersion of claim 24 wherein said liquid carrier is dioctylphthalate.

26. The dispersion of claim 23 wherein said liquid (2) has an equivalent weight of 200–2000.

27. The dispersion of claim 23 wherein said complex 1) is a complex of 4,4'-methylene dianiline and sodium chloride and said liquid (2) is poly(tetramethylene ether)glycol.

28. In a process of curing an amine-curable polymer or prepolymer with a complex of 4,4'-methylene dianiline and a salt, the salt being selected from the group consisting of sodium chloride, sodium bromide, sodium iodide, sodium nitrite, lithium chloride, lithium bromide, lithium iodide, lithium nitrite and sodium cyanide, the ratio of said dianiline to said salt in said complex being 3 moles to 1 mole, the improvement comprising employing said complex in the form of a dispersion in a liquid selected from the group consisting of a poly(alkylene ether)glycol, a poly(alkylene ether)polyol, and a hydroxyl-terminated polyester of a polyhydroxyl alcohol and a polycarboxylic acid.

29. The process of claim 28 wherein said polymer or prepolymer is an isocyanato-terminated polyurethane.

30. The process of claim 29 wherein said complex is a complex of 4,4'-methylene dianiline and sodium chloride, and said liquid is poly(tetramethylene ether)glycol.

* * * * *